Figure 1:
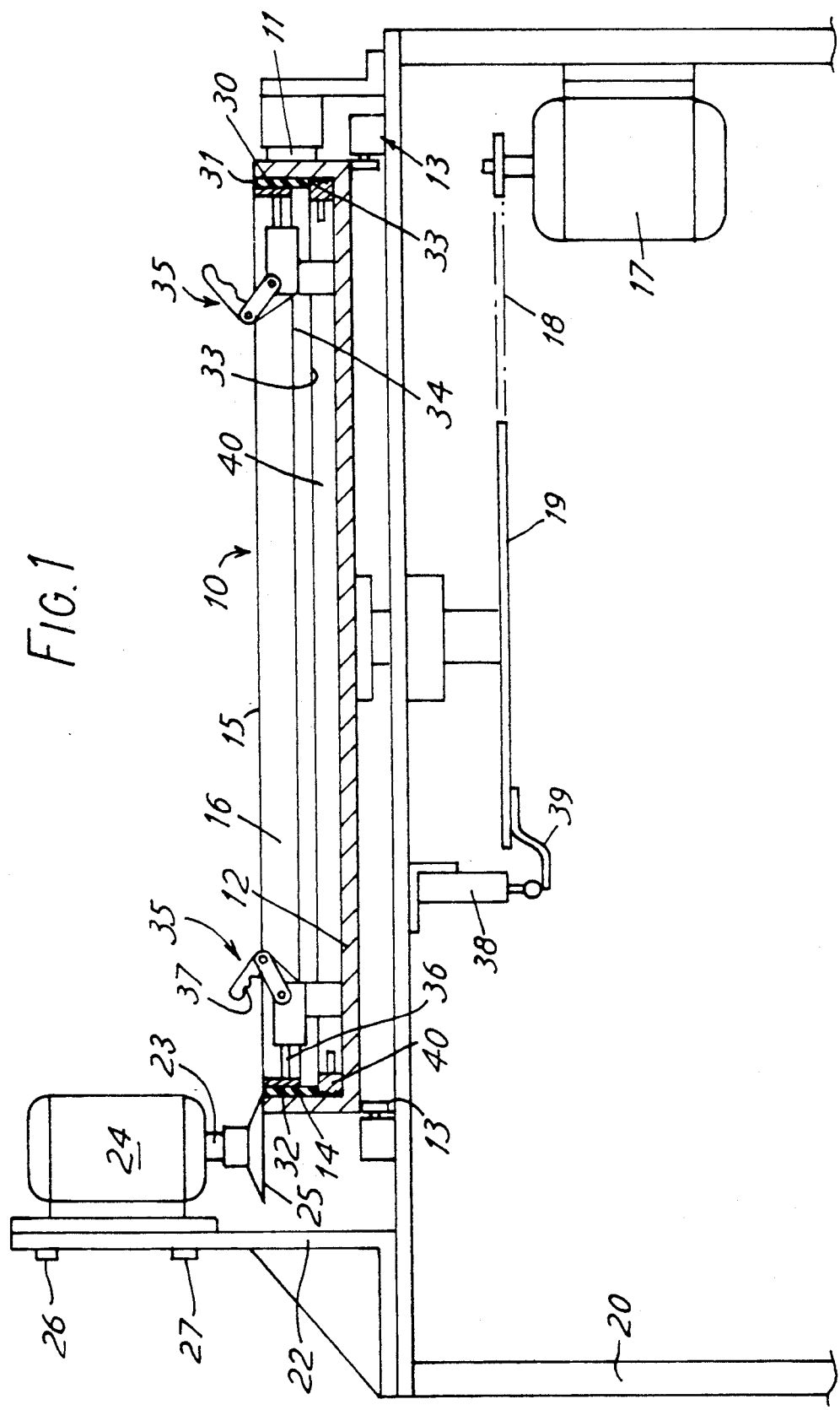

United States Patent [19]

Stevens

[11] Patent Number: 5,174,180

[45] Date of Patent: * Dec. 29, 1992

[54] EDGE SHARPENING

[75] Inventor: Melvyn J. W. Stevens, Kent, England

[73] Assignee: Augustus Martin limited, London, England

[*] Notice: The portion of the term of this patent subsequent to Jan. 29, 2008 has been disclaimed.

[21] Appl. No.: 646,681

[22] Filed: Jan. 28, 1991

Related U.S. Application Data

[63] Continuation of Ser. No. 175,143, Mar. 30, 1988, Pat. No. 4,987,810.

Foreign Application Priority Data

Mar. 31, 1987 [GB] United Kingdom ............. 8707684

[51] Int. Cl.⁵ .................. B26D 1/47; B26D 7/04
[52] U.S. Cl. ............................ 83/19; 83/21; 83/176; 83/411.1; 83/411.3; 83/465; 83/471.2
[58] Field of Search ........... 83/54.21, 56, 176, 187, 83/195, 411.1, 411.3, 422, 432, 434, 471.2, 463, 464, 465, 776, 410.9, 914, 19, 20

[56] References Cited

U.S. PATENT DOCUMENTS

| | | | |
|---|---|---|---|
| 2,973,577 | 3/1961 | Schekowski | 83/455 |
| 3,701,186 | 10/1972 | Kuts | 83/432 |
| 3,791,243 | 2/1974 | Holinski | 83/180 |
| 3,886,657 | 6/1975 | Fabian | 83/614 |
| 4,267,754 | 5/1981 | Allaman et al. | 83/564 |
| 4,302,958 | 12/1981 | Andriessen et al. | 82/95 |
| 4,334,448 | 6/1982 | Messerschmitt | 83/455 |
| 4,604,802 | 8/1986 | Samuelson | 83/743 |
| 4,785,699 | 11/1988 | Oblinger | 83/501 |
| 4,987,810 | 1/1991 | Stevens | 83/176 |

FOREIGN PATENT DOCUMENTS

| | | |
|---|---|---|
| 379302 | 11/1932 | United Kingdom . |
| 423299 | 4/1935 | United Kingdom . |
| 441648 | 5/1936 | United Kingdom . |
| 1054851 | 7/1967 | United Kingdom . |
| 1147407 | 1/1969 | United Kingdom . |
| 1272892 | 11/1972 | United Kingdom . |
| 1401122 | 7/1975 | United Kingdom . |
| 1566547 | 4/1980 | United Kingdom . |

Primary Examiner—Hien H. Phan
Attorney, Agent, or Firm—McAulay Fisher Nissen Goldberg & Kiel

[57] ABSTRACT

A method and apparatus for edge sharpening a strip that provides a doctor blade or a squeegee blade (e.g. for use in screen printing), wherein a rotary cutting blade cuts through the strip between the opposite major faces of the strip, and at fixed angles to said major faces, whilst the strip is move longitudinally relative to the rotary cutting blade. The apparatus, which constitutes a strip blade edge sharpening machine, comprises a rotary cutting blade, a support structure to support the strip in upright attitude upon a minor face of the strip, and a mechanism to effect relative movement between the rotary cutting blade and the strip in a direction longitudinally of the strip such that the rotary cutting blade cuts through the strip between the opposite major faces of the strip, and at fixed angles to said major faces, at a location spaced by a predetermined constant distance from the strip's supported minor face.

5 Claims, 2 Drawing Sheets

EDGE SHARPENING

This application is a continuation of application Ser. No. 07/175,143, filed Mar. 30, 1988, now U.S. Pat. No. 4,987,810 issued Jan. 29, 1991.

This invention relates to edge sharpening of doctor blades and squeegee blades.

Such blades are usually of strip form of rectangular cross-section and cut to the length required from a strip or sheet of resilient material, e.g. natural or synthetic rubber or of plastics material (for example, polyurethane). Such squeegee blades and doctor blades are used for many purposes, e.g. for pressing printing ink into the apertures of a mesh used for screen printing. In each cycle of such screen printing, the rectangular section blade makes a single pass over the screen with just one edge—the arris between a major and a minor area surface of the rectangular section blade—making contact with the screen. When that edge is too worn for further use, the squeegee blade is inverted about its longitudinal horizontal axis and/or rotated 180° about its lateral vertical axis so that another one of its edges can be employed, i.e. presented to the screen. Ultimately, all four edges become used and worn out, necessitating blade replacement.

Theoretically, replacement can be either with a new blade or with a used blade that has been re-edged. Prior attempts at re-edging worn blades by a grinding operation have been generally unsatisfactory in that the grinding operation very often resulted in an edge that was insufficiently regular, i.e. similarly sharp at all contiguous points throughout the strip length. Thus the usual procedure has been to discard the worn blades. With the cost of each new replacement squeegee blade of the order of £50, it is evident that a solution is needed for the problem of edge sharpening resilient strip material.

According to one aspect of this invention there is provided a machine for edge sharpening a strip providing a doctor blade or a squeegee blade, said machine comprising a rotary cutting blade, and means to effect relative movement between the rotary cutting blade and the strip in a direction longitudinally of the strip such that the rotary cutting blade cuts through the strip between the opposite major faces of the strip and at fixed angles to said major faces.

In use of the machine, said relative movement is effected for the whole length of the strip.

Preferably, said machine comprises a frame carrying bearings, a support member mounted on said bearings and to support a said strip for movement longitudinally of the strip past the rotary cutting blade, the arrangement being such as in use to maintain a fixed spacing between the support member and the rotary cutting blade as the strip is carried by the support member past the rotary cutting blade.

Advantageously said bearings mount the support member for rotary movement in a horizontal plane.

Preferably, said edge sharpening machine comprises:
(a) a member having a cylindrical abutment surface,
(b) means to hold said strip with a major face against the cylindrical abutment surface and with a minor face disposed longitudinally beyond one end of the cylindrical abutment surface of said member, and
(c) means to rotate said member about the axis of said cylindrical abutment surface, said rotary cutting blade being arranged to cut through the strip between said minor face and said one end of the cylindrical abutment surface.

Preferably said cylindrical abutment surface is the internal surface of a cylindrical member.

Advantageously the holding means comprises a split ring member for engaging the opposite major face of the strip to sandwich the strip between the split ring member and the cylindrical abutment surface.

Preferably the holding means additionally comprises a plurality of lever mechanisms providing, at angularly spaced intervals, radially directed thrust rods to engage the split ring member and urge it against said opposite major face of the strip thereby to sandwich the strip as aforesaid.

Advantageously each of said lever mechanisms incorporates a toggle or like over-centering device to extend and retract the mechanism's thrust rod radially thereby respectively to effect and release sandwiching of the strip as aforesaid.

Preferably each thrust rod is adjustable in length.

Alternatively, the holding means may comprise a disc mounted rotatably about its axis and to engage, by its peripheral surface, the opposite major face of the strip to sandwich the strip between the disc and the cylindrical abutment surface. Preferably, the diameter of the disc is substantially less than that of the cylindrical abutment surface.

Preferably the axes of rotation of the rotary cutting blade and of the cylindrical abutment surface are substantially parallel to one another, whereby the said fixed angles of the cut (new) minor face to the said major faces are substantially equal to one another and to 90°.

According to another aspect of this invention there is provided a method of edge sharpening a strip providing a doctor blade or a squeegee blade, wherein a rotary cutting blade cuts through the strip between the opposite major faces of the strip and at fixed angles to said major faces whilst the strip is moved longitudinally relative to the rotary cutting blade.

Figure 2:
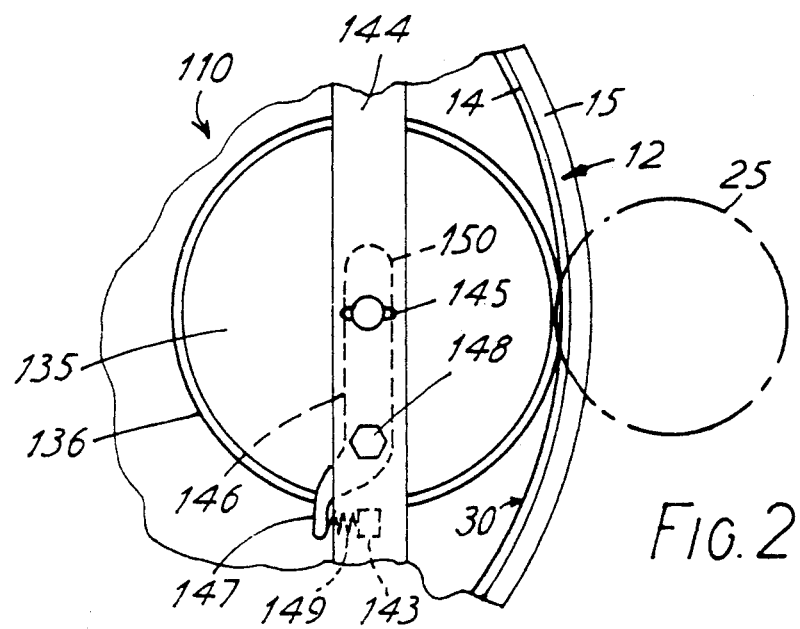
Figure 3:
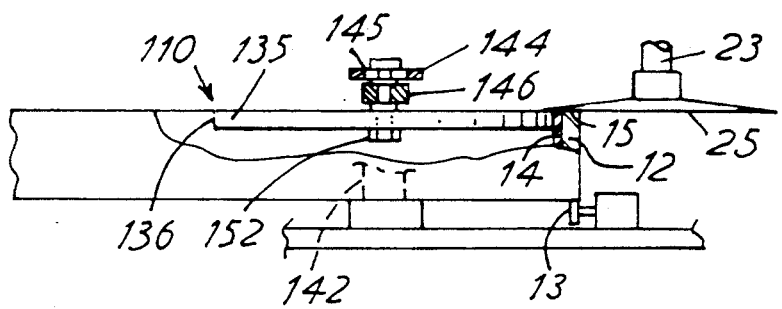
Figure 4:
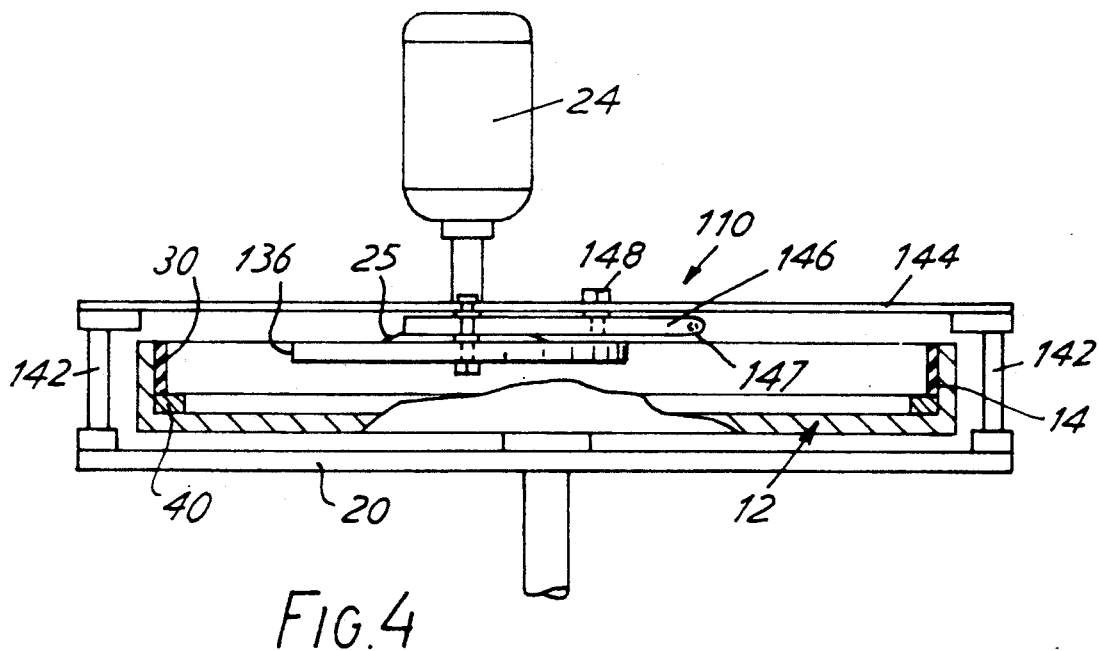

By way of non-limiting example, embodiments of this invention will now be described with reference to the accompanying drawings of which:

FIG. 1 is a schematic axial cross-sectional view through a machine according to this invention, FIG. 2 is a schematic plan view of part of a modified machine according to this invention, and FIGS. 3 and 4 are schematic axial cross-sections, at right-angles to one another, of the machine of FIG. 2.

The illustrated exemplary machine 10 is for edge sharpening a resilient strip 30, e.g. a rubber or polyurethane squeegee blade for screen printing. The strip 30 is of generally rectangular cross-section having opposed, parallel major surfaces 32,34 and opposed, parallel minor faces 31,33. The junction or arris of each major face and a minor face, defines one of the four edges of the strip 30.

The machine 10 comprises a main frame 20 provided at one side with an upstanding support 22. An electric motor 24 is mounted on the support 22 by setting screws 26, 27 which serve for adjusting the attitude of the motor's spindle 23 in three orthogonal planes. A rotary cutting blade 25 of the saw-type is mounted on the spindle 23. A shallow cup-shaped member 12, having an internal cylindrical abutment surface 14 and a flat horizontal top surface 15, is mounted on bearings 13 on the frame 20 to underlie the cutting blade 25. In plan view, the circular outline of cutting blade 25 intersects the circular outlines of both internal and external cylindrical surfaces of member 12.

A split ring 16 is disposed within cup-shaped member 12 to hold the strip 30 with one major face 32 against the cylindrical abutment surface 14 and with one minor face 31 disposed longitudinally beyond the top surface 15 of member 12. It will be apparent that the split ring 16 engages the opposite major face 34 of the strip 30 to sandwich the strip 30 between the split ring 16 and the cylindrical abutment surface 14.

A plurality of lever mechanisms 35 are mounted, at angularly spaced intervals, on the base of the cup-shaped member 12. Each lever mechanism 35 comprises a radially directed thrust rod 36 to engage the split ring 16 and urge it against said opposite major face 34 of the strip 30 thereby to sandwich the strip as aforesaid. To extend and retract the thrust rod 36, each of said lever mechanisms incorporates a handle-operated toggle or like over-centering device 37 to effect and release sandwiching of the strip 30. To ensure that the holding force applied by each lever mechanism 35 is sufficiently small to just hold the strip 30 in position during cutting without unduly compressing it, each thrust rod 36 is adjustable in length. To this end each thrust rod 36 may comprise a threaded bolt or stud projecting from a plate forming the "output" of device 37, the degree of projection being setable by means of lock nuts threaded onto the bolt or stud and engaging opposite sides of the plate.

The bottom portion of internal cylindrical surface 14 is threaded and is engaged by an externally threaded ring 40. In use of the machine, this ring 40 serves as a horizontal base support for the strip 30, the latter's minor face 33 (opposite the face 31 to be cut) being placed thereon and the ring 40 then rotated to set the degree of projection above surface 15 of the strip's opposite minor face 31.

Another electric motor 17 is provided to rotate the cup-shaped member 12 about the axis of cylindrical abutment surface 14. This is accomplished via a 5:1 step-down transmission including a drive chain 18 and a gear wheel 19 mounted axially below the member 12. The arrangement is such that, as the member 12 is rotated with the strip 30 in position, the rotary cutting blade 25 cuts through the strip 30 between said minor face 31 and said top surface 15 of the member 12, the cut extending through the strip from one major face 32 to the opposite major face 34. During cutting, a water miscible or soluble "oil" coolant is supplied to the cutting zone.

An electric cut-off switch 38 for motor 17 is mounted on the frame 20 in a position so as to be operated by a striker plate 39 attached to the underside of gear wheel 19. This is provided with an appropriate time delay device to ensure that the drive to the cup-shaped member 12 is stopped a short interval of time, e.g. 5 seconds, after the member 12 has completed a single revolution. This time delay allows the striker plate 39 to pass beyond the cut-off switch 38 and permit re-starting of the motor 17 for a subsequent sharpening operation. To assist stopping of the cup-shaped member 12—and also provide for an even rotational speed in use—the external surface of member 12 may be engaged by a rubbing brake element 11, the frictional force of which is in use surmounted by the rotational drive provided from motor 17.

The modified machine 110 of FIGS. 2 to 4 incorporates alternative strip holding means to the split ring 16 and lever mechanisms 35 of the machine 10 of FIG. 1.

As shown in FIGS. 2 to 4, the modified machine 110 comprises a pair of upstanding pillars 142 mounted on the main frame 20, the pillars 142 supporting between them a bridging element 144. The arrangement is such that the bridging element 144 extends above and across the cup-shaped member 12 along a chord of its cylindrical abutment surface 14 and adjacent to the cutting blade 25. A lever 146 is pivotally attached, intermediate its ends, to the underside of the bridging element 144 by a nut and bolt fastening 148. The lever 146 is provided at one end with a dog-leg formation 147, and a compression spring 149 acts between this formation and an abutment 143 (depending from the bridging element 144) such as to urge the lever's opposite end 150 towards the cutting blade 25 (clockwise about pivot 148, as viewed in FIG. 2). The lever 146 is provided adjacent its end 150 with a hole to receive the shank of a shouldered or stepped bolt fastening 152, and above this hole the bridging element 144 is provided with a transverse slot 145, e.g. of arcuate form centered on the lever's pivot axis provided by fastening 148.

A centrally apertured metal disc 135 is attached to the lever 146 and bridging element 144 by means of the shouldered bolt fastening 152, the bolt's shoulder or step fitting into the disc's central aperture and permitting free rotation of the disc 135 about the bolt's axis colinear with the disc's axis. A similar result may be achieved by replacing the shouldered bolt 152 by a T-section bushing fitting into the disc's central aperture, a conventional bolt extending axially through the bushing.

In use, the compression spring 149 urges the lever 146, and the disc 135 it carries, towards the cutting blade 25 and such that the discs's peripheral surface 136 engages the major face 34 of the strip 30 opposite to the strip's major face 32 in abutment with the internal surface 14 of the cup-shaped member 12. The arrangement is thus such as to sandwich the strip 30 between the disc and the cylindrical abutment surface 14 just in the vicinity of the cutting blade 25 (rather than all around as in the machine 10 of FIG. 1). The strip 30 being re-edged is thus appropriately held solely in the region being cut as the strip itself is moved beneath the cutter blade 25.

It will be appreciated that the provision of transverse slot 145 allows for different thicknesses of strip to be accommodated. It will be apparent that the disc 135 is rotated—in the same direction—by the strip 30 clamped (by the disc) to the rotating cup-shaped member 12. It will also be appreciated that the disc 135 may have its periphery 136 provided by a band of rubber or other frictional material to assist in such rotation of the disc and to avoid (or at least minimize) any slipping between the disc and the strip whilst the latter is being moved past the cutting blade 25.

Somewhat surprisingly it has been found that the cut new minor face of the resilient strip 30 formed by the illustrated machine provides, at each of the major faces 32,34 which it meets, an excellent edge of consistent angular form throughout the length of the strip. The thickness of removed material may be as low as 25 thousandths of an inch (0.6 mm) whereby the same strip may be edge re-sharpened by machine 10 or machine 110 on several occasions following wear-inducing use. The rotary cutting blade 25 may, perhaps, have its life prolonged by adjusting its attitude via adjusting screws 26,27 (see FIG. 1) so that, in cutting or slicing through the strip, it also just engages, and is thus sharpened by, the upper surface 15 of the steel cup-shaped member 12.

For initial setting up of the machine, a lapping disc may be mounted on the spindle 23 (instead of the rotary cutting blade 25) and, with the spindle vertical, may be used to lap the top surface 15 of the member 12 to the horizontal.

I claim:

1. A method of edge sharpening a strip providing a doctor blade or a squeegee blade, comprising the steps of:

supporting the strip in an upstanding position with a minor face of the strip in a lowermost position;

holding the supported strip between a holding member and a cylindrical member and against a cylindrical abutment surface of said cylindrical member; and moving the strip about the axis of said cylindrical abutment surface longitudinally relative to a rotary cutting blade such that said blade cuts through the strip between the opposite major faces of the strip and at fixed angles to said major faces at a predetermined constant distance from said lowermost minor face of the strip.

2. The method of claim 1, wherein said cylindrical abutment surface is the internal surface of said cylindrical member, and said strip is held in abutment against said internal surface of said cylindrical member.

3. The method of claim 1, wherein said relative movement is effected for the whole length of the strip.

4. A machine for edge sharpening a strip providing a doctor blade or a squeegee blade, wherein said machine comprises:

(a) means to support the strip in an upright attitude with a minor face of the strip in a lowermost position, (b) a cylindrical member having an internal cylindrical abutment surface, (c) means to hold the strip with a major face against said cylindrical abutment surface and with an uppermost minor face disposed longitudinally beyond one end of said cylindrical abutment surface, (d) means to rotate said member about the axis of said cylindrical abutment surface, (e) a rotary cutting blade, and (f) means to effect relative movement between said rotary cutting blade and the strip in a direction longitudinally of the strip such that said blade cuts through the strip between the opposite major faces thereof and at fixed angles to said major faces, at a location between said uppermost minor face and said one end of said cylindrical abutment surface.

5. The strip blade edge sharpening machine of claim 4, wherein the axis of rotation of said rotary cutting blade and of said cylindrical abutment surface are substantially parallel to one another, whereby the said fixed angles of the newly cut minor face to the said major faces are substantially equal to one another and to 90°.

* * * * *